Sept. 16, 1958     H. TROEGER ET AL     2,851,758
CLAMPING RING
Filed Jan. 17, 1955     2 Sheets-Sheet 1
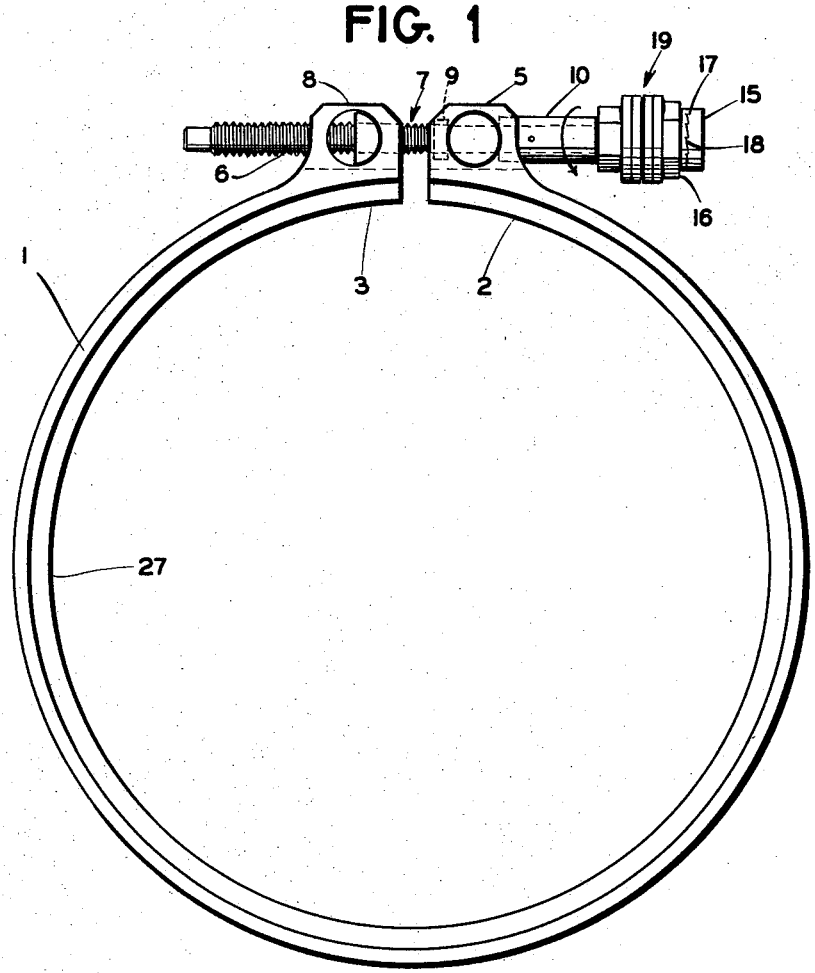
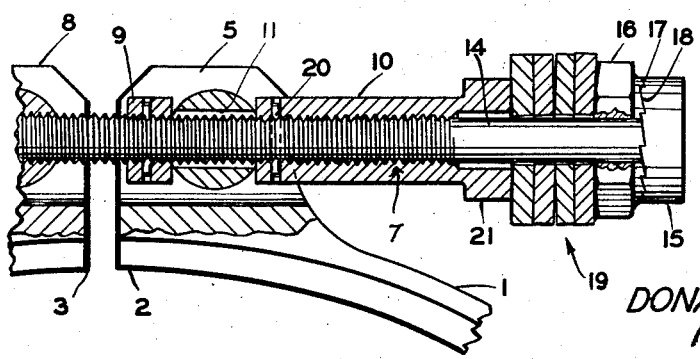
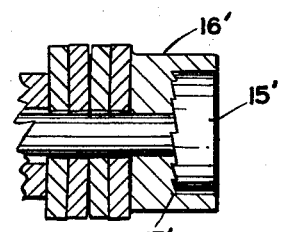
INVENTORS
DONALD PALFREYMAN
HENRY TROEGER
BY Nicholas J. Garofalo
ATTORNEY Sept. 16, 1958 H. TROEGER ET AL 2,851,758
CLAMPING RING
Filed Jan. 17, 1955 2 Sheets-Sheet 2

INVENTORS
DONALD PALFREYMAN
HENRY TROEGER
BY Nicholas J. Garfalo
ATTORNEY

United States Patent Office
2,851,758
Patented Sept. 16, 1958

2,851,758

CLAMPING RING

Henry Troeger, Ramsey, and Donald Palfreyman, Clifton, N. J., assignors to Bendix Aviation Corporation, Teterboro, N. J., a corporation of Delaware Application January 17, 1955, Serial No. 482,162

9 Claims. (Cl. 24—279)

This invention pertains to clamping rings. More particularly, it is concerned with a novel and improved type of split clamping ring that finds particular use in coupling accessories, such as a starter unit, pump, or the like, to an engine.

The clamp of the present invention has desirable features and advantages, whereby it may be characterized as of an improved and practical type.

The invention, in general, comprises a split ring of resilient metal which is adapted to encompass a portion of one unit and a complementary portion of another unit. It is tightened securely about the complementary units by nut and bolt means associated with the free ends of the clamp.

A feature of the clamp is its general construction whereby one device may be securely clamped to another without danger of it falling away from the other.

A more particular feature of the invention is found in the bolt and nut means whereby the clamp is tightened. The bolt and nut means cannot, because of their peculiar and novel construction, be overtightened. The amount of torque force that may be applied to the bolt may be predetermined, and when the bolt has reached this limit, further wrenching or torque application has no further tightening effect upon the bolt. The advantages of a clamp ring incorporating torque limiting means in securing elements of the clamp are obvious. A particular advantage is the prevention of thread stripping or other damage to the bolt and nut securing means. This is a safety feature of the clamp. The clamp finds particular use in aircraft in securing various accessories to the engine, since it avoids any possibility of the clamp spreading and causing the connected units to separate.

A general object of the invention is to provide a novel and improved type of split clamp ring whereby an engine accessory may be securely held to the engine without fear of it falling away or of the clamp ends spreading apart.

Another object of the invention is a split clamping ring, the free ends of which may be drawn together by bolt and nut means having a self torque limiting feature.

A still further object of the invention is self torque limiting nut and screw fastening means.

The invention further lies in the novel devices, combination of devices and arrangement of parts hereinafter described and defined in the claims.

The foregoing and other objects and advantages of the invention will appear more fully hereinafter from a consideration of the detailed description which follows, taken in conjunction with the accompanying drawing wherein an embodiment of the invention is illustrated by way of example. It is to be expressly understood, however, that the drawing is for purposes of illustration and description only, and is not intended as a definition of the limits of the invention.

Referring to the drawings:

Fig. 1 is a plan view of a clamping ring embodying the invention;

Fig. 2 is an enlarged detail of the fastening means of the clamp;

Fig. 3 is a modified form of the wrenching member; and

Figure 4:
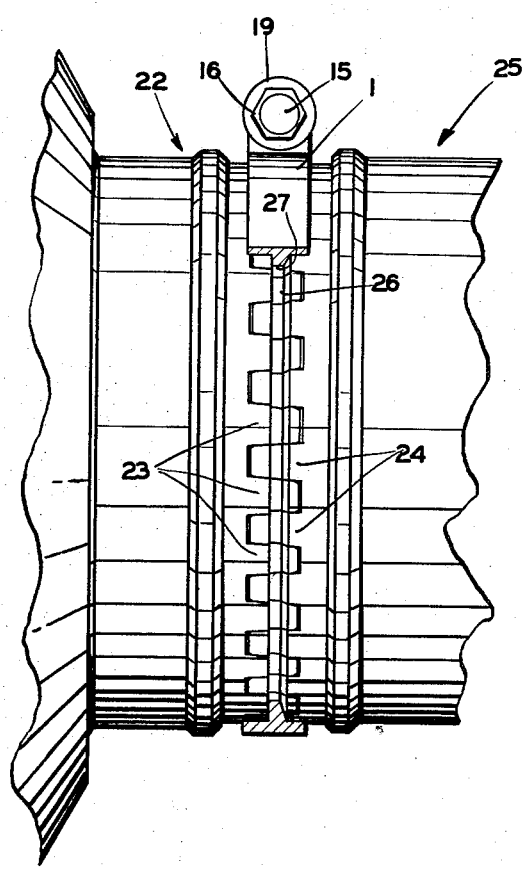
Fig. 4 is an illustration of a use of the clamping ring.

In the drawings there is shown a clamping ring 1 that is split through at one point to provide a pair of free ends, 2, 3. The clamp is of resilient metal, and the free ends thereof are biased toward one another. This structure permits the free ends to be spread apart so that they may be fitted about a pair of connectible units, as in Fig. 4. The resilient nature of the clamp and the inward tension of the free ends permit the latter to clamp about the connectible units when released.

The free ends of the clamp are formed to accommodate screw means, whereby the free ends may be spread apart or drawn together as desired and held in their moved position. To this end suitable trunnion means 5 projecting from the outer portion of free end 2 provides an axially extending unthreaded hole 11 through which the elongated shank of a screw member 7 is freely slidable. Lug nut means 8 projecting from the outer portion of the other free end 3 provides a threaded hole or nut through which a threaded portion 6 of the shank of the screw 7 is adapted to be threaded.

Pinned fast to the screw member 7, one at either side of trunnion 5, and desirably in close relation to the latter, are screw positioning members 9, 10. It is apparent that members 9 and 10 will rotate with screw 7 and do not move axially in relation to the trunnion 5. The pinned members 9, 10 serve to position the screw member relative to trunnion 5, so that the screw 7 does not move lengthwise in relation to trunnion 5. By this arrangement wherein the screw 7 is anchored to end 2 of the clamp, it is clear that as the screw member is threaded in one direction through lug nut 8, the free end 3 of the clamp will be carried toward the free end 2; and that as the screw member is threaded in the opposite direction, the free end 3 will be carried away from end 2.

It is further clear that, when the free ends 2, 3 are carried into abutment with one another, further turning or torque force applied to the screw member will tend to strain the related parts and possibly strip the threads of either the screw member 7 or the lug nut 8, or may do other damage. Strained parts of the clamping ring are apt to break down when least expected, and as a result the units which the clamping ring is intended to hold together may loosen and malfunction, or fall away. This could prove dangerous, particularly where the clamping ring is used in aircraft to hold an accessory, such as a pump, starter, or other vital member to the engine.

This overtightening of the screw member occurs when the device is assembled and employed to secure two separate units or devices together. Torque calibrating instruments may be used in lieu of the skill or feel of the mechanic as a guide to the limit of torque force to be applied in tightening the screw member. The clamping ring of the present invention is designed to eliminate the guessing of the mechanic, or the need of calibrated torque wrenches. There is incorporated in the structure of the clamp ring of the present invention self torque limiting means, whereby the degree of torque that may be applied to tighten the screw member is controlled to a predetermined degree.

To the end of controlling the torque to be applied in tightening the screw member, the latter provides a short, smooth or unthreaded shank portion 14 (Fig. 2) which is terminated by a circular drive head 15. Rotatable on this smooth shank is a wrench collar member 16. The latter is of block or hexagonal form so that a wrench may be applied to turn or rotate the same. The outer end of this wrenching member or turn collar 16 provides a ratchet face 17, the teeth of which mate with teeth of a complementary ratchet face 18 of the screw drive head. The mating of the ratchet teeth is such that, turning of the wrenching member 16 in a counterclockwise or left direction (as indicated by arrow, Fig. 1) provides a positive engagement of the ratchet teeth with one another to drive the screw member so as to thread ends 2 and 3 apart. The teeth will, however, slip over one another when the wrenching member is turned in the opposite or clockwise direction. This slipping is, however, normally avoided by suitable spring means 19, loaded on the screw shank 14 between the fixed positioning member 10 and the wrenching member 16. The spring load constantly tensions the ratchet face of the latter into engagement with that of the screw head. The load of the spring is such, that torque applied in turning of the wrenching member 16 in a clockwise direction (Fig. 1) will be transmitted to the screw member and will cause the latter to thread through the lug nut 8 so as to bring the ends 2 and 3 toward each other. When the torque force applied clockwise to the wrenching member exceeds the spring load, the latter will yield, whereupon the ratchet teeth of the wrenching collar 16 will, upon further turning of the latter, slip over the teeth of the screw head without effecting any further threading of the screw member.

It is clear, therefore, that the extent to which the free ends 2, 3 of the clamping ring may be tightened toward one another, or about a pair of connectable units of an engine, may be controlled by increasing or decreasing the load of the spring means. The load of the spring may be adjusted by means of the tubular positioning member 10. The adjusted position of the latter is fixed by a pin 20.

A plurality of springs of the dished washer type, commonly known as Belleville springs, are preferable to make up the spring load. In loading the springs it is essential that the springs will, when the load thereof is exceeded by the torque applied in a clockwise direction to the wrenching member, yield a distance sufficiently to enable the ratchet teeth of the wrenching member to cam or slip over the teeth of the screw head. This degree of yield should be at least a distance slightly greater than the depth of the teeth of the wrenching member.

It is to be noted that the positioning member 10 is threaded onto the screw member and provides a nut form 21 at one end so that it may be turned by a wrench. By this structure, a fine adjustment in the spring load may be made by adjusting the position of the member 10 before pinning it fast to the screw member 7.

It is to be noted that the screw head 15 is circular and the periphery thereof is smooth. This prevents a wrench intended for the wrenching member 16 from being directly applied to the screw head. In Fig. 3 the wrenching member or collar designated as 16' is of a modified form, in that it provides a longer wrenching surface to facilitate application of a wrench thereto. In this form the outer end of the collar is recessed, and the ratchet face 17' is formed in the recessed wall of the collar. The recess formed is deep enough to wholly receive the complementary screw head 15'.

In Fig. 4, wherein the ring is illustrated as securing an accessory unit to an aircraft engine, there is shown an adapter end 22 of a starter unit accessory, having a plurality of spaced fingers 23 which have been interlocked with the complementary fingers 24 of an adapter 25 associated with the engine. A continuous channel 26 is formed in the peripheral surface of the interlocking fingers 23, 24. A rib 27 running centrally along the inner face of the clamp ring is positioned in the channel. The free ends 2, 3 of the clamping ring are then tightened towards one another by turning the wrenching collar 16 clockwise until the latter begins to slip in the manner as described above. Thus, rotation of collar 16 by a wrench will rotate screw head 15 and the threaded part 6 of screw 7 through the threaded hole of lug nut 8. This action will draw ends 2 and 3 of the clamp ring together until abutment results when collar 16 slips at the ratchet teeth 17, 18. Springs 19 prevent slipping until a predetermined torque is exerted when the springs are compressed as above described. The right end of the hole 11 of trunnion 5 provides a reaction point since it is in contact with the left end of the positioning member 10 which is fixed to the screw 7. Separation of the ends 2, 3 will occur with opposite rotation of turn collar 16 and with positive engagement of the ratchet teeth 17, 18. During this separation action, positioning member 9 fixed to the screw provides a reaction point at the trunnion 5 as the screw threads out of lug nut 8.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art. It is our intent, therefore, to claim the invention not only as shown and described, but also in all such forms thereof as may be reasonably construed to be within the spirit of the invention and the scope of the appended claims.

What is claimed is:

1. In a split ring clamp having a pair of free ends, a trunnion extending from the peripheral portion of one free end and having a hole axially therethrough, a lug nut formed on the peripheral portion of the other free end and having a threaded hole opposed to the hole of the trunnion, an elongated screw member freely received through the trunnion hole and threadedly engaged in the hole of the lug nut, a pair of positioning members spaced and fixed on the screw in close relation to each side of the trunnion, the screw member having an elongated portion extending beyond the outer positioning member and having a drive head at the end of such portion, a turn collar freely received on the extended portion of the screw inwardly of said drive head, and spring means between the outer positioning member and the turn collar urging the turn collar into abutment with the drive head below a predetermined torque.

2. In a split ring as in claim 1 wherein the turn collar has an end face including ratchet teeth, and said screw drive head has an inner face end portion provided with teeth complementary to and engageable with the ratchet teeth in said turn collar.

3. In a split ring as in claim 1 wherein the turn collar has an end face including ratchet teeth, the inner face end of the screw head has opposed complementary ratchet teeth, the spring means is of the dished washer type and the teeth of the turn collar are held by the spring means in engagement with the teeth of the drive head, the teeth of both members being positively engaged when the turn collar is turned in a particular direction, and the teeth of the turn collar adapted to slip engagement when the turn collar is turned in the opposite direction by a torque force exceeding the spring load.

4. Torque limiting screw means comprising an elongated screw having a threaded end and an unthreaded shank end, a positioning member fixed to the threaded end of the screw member adjacent the shank end, a drive head at said shank end of the screw, a wrench collar turnable freely about the screw member adjacent the drive head, and spring means between the positioning member and the collar loading the collar into abutment with the drive head, the collar and drive head adapted under the spring load to turn together when the collar is turned by a torque force less than the load of the spring means.

5. Torque limiting screw means comprising a screw member having an elongated shank and a cylindrical drive head at one end thereof, a positioning member fixed to said screw member and in spaced relation to the drive head, a wrench turn collar freely turnable about the shank adjacent the drive head, and spring means loaded between the positioning member and the turn collar constantly tensioning the turn collar into contact with the drive head.

6. In the screw means set forth in claim 5 wherein the turn collar and drive head have opposed faces each provided with ratchet teeth adapted to engage with one another for positive rotation of the drive head with the turn collar when the latter is turned in a particular direction, for rotation of the one with the other when the turn collar is turned in the opposite direction by a torque force less than the spring load, and for rotation of the turn collar alone when the latter is turned in the latter direction by a torque force in excess of the spring load.

7. The combination of a split ring having a pair of free ends and self-torque-limiting tightening means associated with said free ends for drawing said ends together, said tightening means including a partially-threaded screw member, one of said free ends threadedly receiving one end of said screw member, the other of said free ends having a hole through which a threaded portion of said screw member freely extends, positioning means associated with said other free end and said screw member and arranged so that said screw member is anchored to said other free end, ratchet teeth connecting the other drive end of said screw member to a wrenching collar arranged to be freely rotated on said screw member, and tensioning means between said positioning means and said wrenching device constructed and arranged to urge said wrenching collar and said drive end into engagement only when less than a predetermined torque is applied to said wrench collar.

8. The combination of claim 7 and being further characterized in that said tensioning means has a distance of yield which is slightly greater than the depth of the teeth of the wrenching collar.

9. The combination of claim 8 and being further characterized in that said drive end of said screw member is a circular head having a flat end which is free of indentations.

References Cited in the file of this patent

UNITED STATES PATENTS

| | | |
|---|---|---|
| 2,345,269 | Lackey | Mar. 28, 1944 |
| 2,538,468 | North | Jan. 16, 1951 |
| 2,659,953 | Woolsey | Nov. 24, 1953 |
| 2,695,649 | Tilden | Nov. 30, 1954 |

FOREIGN PATENTS

| | | |
|---|---|---|
| 67,924 | Switzerland | 1914 |
| 703,769 | Germany | Mar. 15, 1941 |